No. 766,754. PATENTED AUG. 2, 1904.
F. W. CARLSON.
PIPE COUPLING OR CONNECTION.
APPLICATION FILED NOV. 16, 1903.
NO MODEL. 2 SHEETS—SHEET 1.
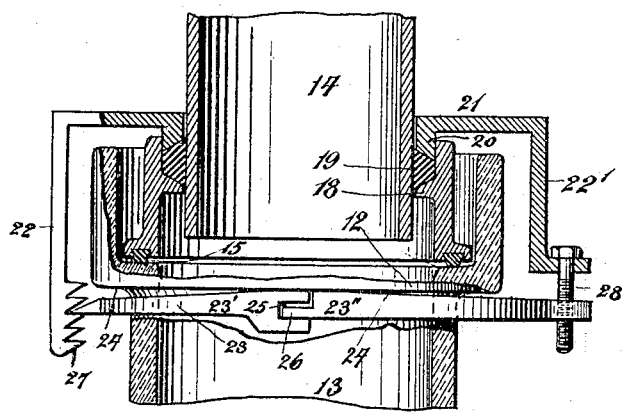
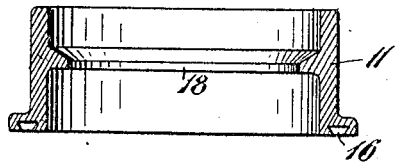
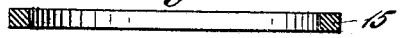
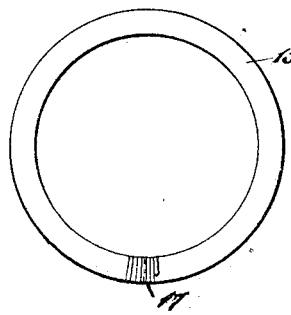
WITNESSES
Geo. H. Mayer.
M. Sönnichsen.
INVENTOR
Frank W. Carlson
BY
Wm. O. Belt
ATTORNEY

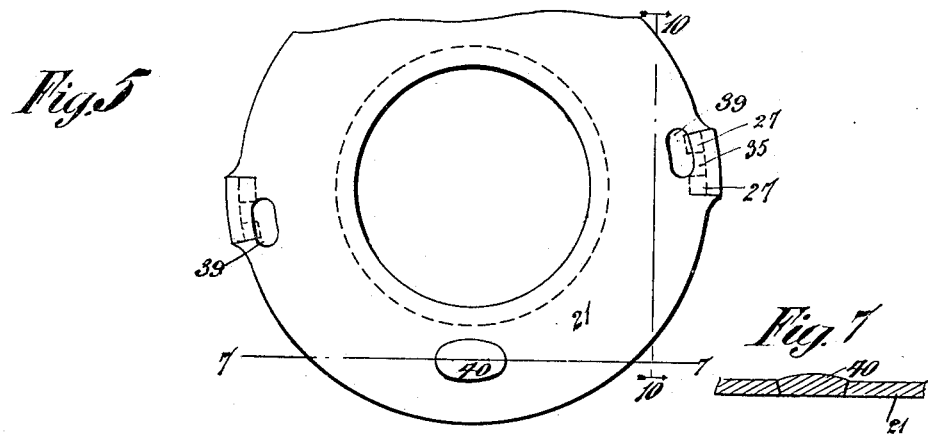
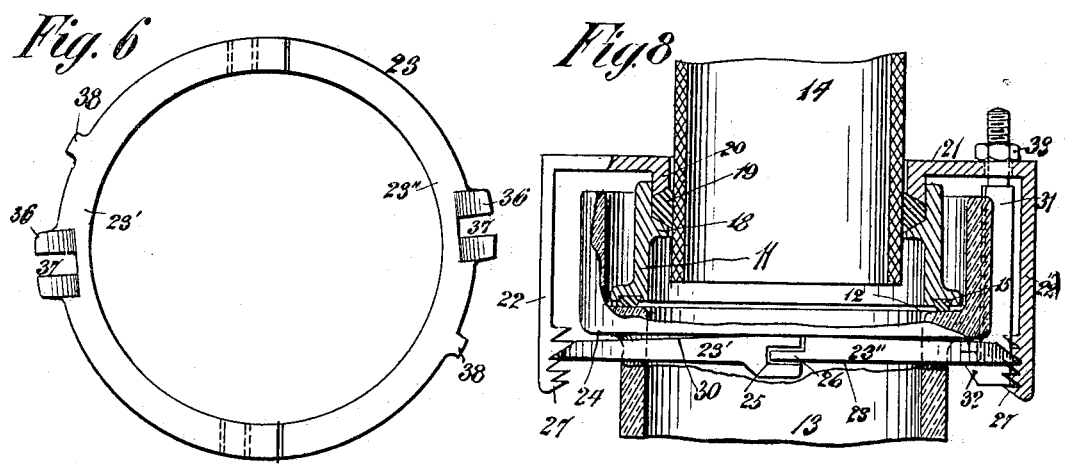
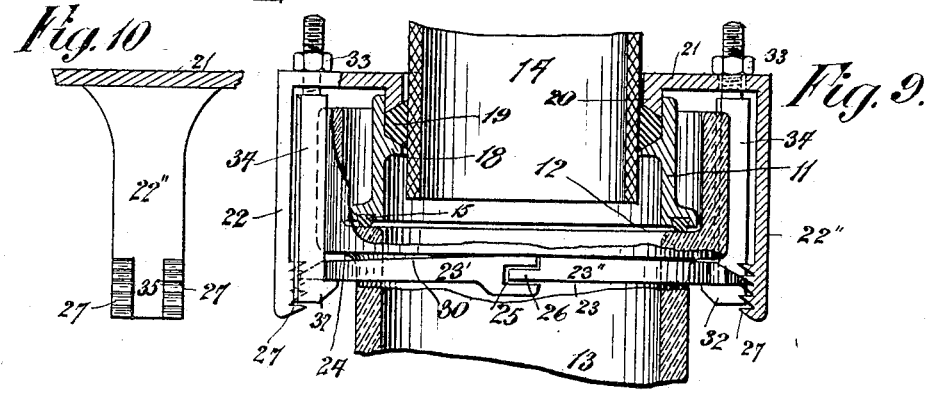

No. 766,754. Patented August 2, 1904.

UNITED STATES PATENT OFFICE.

FRANK W. CARLSON, OF CHICAGO, ILLINOIS.

PIPE COUPLING OR CONNECTION.

SPECIFICATION forming part of Letters Patent No. 766,754, dated August 2, 1904.

Application filed November 16, 1903. Serial No. 181,435. (No model.)

*To all whom it may concern:*

Be it known that I, FRANK W. CARLSON, a citizen of the United States, residing at Chicago, in the county of Cook and State of Illinois, have invented certain new and useful Improvements in Pipe Couplings or Connections, of which the following is a specification.

The present invention relates to pipe couplings or connections especially adapted for making a gas and water tight joint between sewer and soil pipes or for a clean-out connection; and it consists of certain novel improvements on the invention disclosed in my application, Serial No. 169,609, filed August 15, 1903.

The object of the invention is to provide a coupling of few parts and simple construction which can be manufactured at low cost and easily and quickly adjusted and secured in place.

In the accompanying drawings, Figure 1 is a sectional view illustrating the invention in its simplest form. Figs. 2 to 4 are detail views. Fig. 5 is a top plan view of the yoke shown in Fig. 9. Fig. 6 is a similar view of the divided lever. Fig. 7 is a sectional view on the lines 7 7 of Fig. 5. Fig. 8 is a sectional view showing a single bolt for adjusting the connection. Fig. 9 is a similar view showing two bolts. Fig. 10 is a sectional view on the line 10 10 of Fig. 5.

Referring to the drawings, in which like numerals of reference denote corresponding parts in the several figures, 11 designates a hollow member of my improved coupling or connection which rests upon a shoulder 12 within the end of the sewer or other pipe 13 and constitutes the main connection between said pipe and the soil or other pipe 14, which enters the member through its upper end. A packing-ring 15 is held in an annular groove 16, Figs. 3, 4, in the member 11 and is adapted to make a tight joint with the shoulder 12 of the sewer-pipe 13. I prefer to make this packing-ring out of a single strip of packing and fasten the ends together by a wrapping of tape or cord 17, Fig. 2. The member 11 is provided with a flange 18 to support the packing 19 and form with the gland 20 a stuffing-box to make a tight joint between said member and the soil-pipe 14.

The coupling or connection is clamped tightly in one operation to both of the pipes by means of a yoke 21, which carries the gland 20 and has oppositely-arranged depending ends 22 22', which are engaged by a two-section ring-lever 23, operating beneath the peripheral shoulder 24 on the sewer-pipe. This lever is made in the form of a divided ring constructed to encircle the sewer-pipe beneath its shoulder 24 and having the ends of its two sections constructed to operatively engage or interlock with each other. In the drawings I have shown a simple way of accomplishing this result by providing a groove or socket 25 in the ends of the section 23' to receive a tongue 26 on the ends of the section 23''; but other means of engaging the two sections of the ring-lever for the same purpose may be provided. The lever may be engaged with the yoke in the manner shown in Figs. 1, 8, or 9. In the construction of Fig. 1 the lever is first engaged with one of the stops or projections 27 on the depending end 22, and then the bolt 28 is tightened to adjust the parts relatively as required. The lever is adapted to be fulcrumed midway between its ends against the shoulder 24 of the sewer-pipe, and this may be accomplished, as shown in the drawings, by inclining the operative face 30 of the lever upward from its ends to its center, making the lever higher at the center than at its ends. In the foregoing construction it will be observed that only a single bolt is employed in the coupling, and by means of this bolt the coupling is not only secured in place, but its several parts are simultaneously adjusted to make tight joints with both of the pipes.

In Fig. 8 I have shown another one-bolt construction, in which the depending end 22'' is made like the end 22, with stops or projections 27, adapted to be engaged by the ring-lever. In this construction the lever is first engaged with one of the stops on the end 22, and then the bolt 31 is slipped into place between the end 22″ and the sewer-pipe and its head 32 engaged with the lever. It will readily be understood that when the nut 33 is tightened the bolt will draw up the lever, causing the arms 22 22″ to spread sufficiently to permit the lever to slip up over the stops on the end 22″ until the coupling has been properly adjusted and the several parts thereof tightly secured on the pipes.

In Fig. 9 I provide two bolts 34, which are constructed and adapted to be operated like the bolt 31 shown in Fig. 8. The stops or projections are preferably arranged on the depending ends of the yoke in two parallel series, separated by an opening 35 to accommodate the bolt, Fig. 10, and the ring-lever is correspondingly provided with a projection 36, divided into two parts to engage the two series of stops on the end by an opening 37 to receive the bolt, Fig. 6. After the parts have been properly adjusted in the couplings shown in Figs. 8 and 9 the bolts can be withdrawn without releasing the parts, and this may be done and the bolts used over and over again, if desired.

In the construction shown in Fig. 1 the lever may be unlocked by unscrewing the bolt 28, and in the constructions shown in Figs. 8 and 9 the lever is unlocked by striking one of the projections 38 to move the lever slightly until the lugs 36 are disengaged from the stops 27. The bolt-openings 39, Fig. 5, are elongated to permit this unlocking operation. A removable plug 40 may be provided in the yoke to permit water to be poured into the spaces and between the member 11 and the end of the sewer-pipe for testing the joint between these parts, Figs. 5, 7.

My invention is particularly intended to be used as a coupling or connection for an earthenware sewer-pipe and a metal soil-pipe; but of course I do not limit the invention to this particular use. By clamping the coupling or connection independently on both of the parts and also securing the coupling in place at the same time, with one bolt or with two bolts, as the case may be, I not only provide a gas and water tight joint with each of the pipes, but also greatly simplify the application of the coupling and avoid the necessity of using a number of different parts for adjusting and securing the coupling in place. The divided lever can be very quickly and easily adjusted in place on the sewer-pipe, and this is a matter of considerable importance, for these pipes are often located where the application of the coupling is a matter of more or less difficulty; but it will be readily understood that the two sections of the lever can be slipped into place easily and quickly beneath the shoulder of the sewer-pipe and engaged with each other in or about the manner illustrated in the drawings and the parts adjusted in position with equal facility after the sewer-pipe has been laid.

The present invention is valuable, because it can be embodied in constructions like those shown in Figs. 1 and 8, requiring only a single bolt for adjusting and securing it in place on the pipes, and for the further reason that it can be embodied in the constructions like those shown in Figs. 8 and 9, which permit the bolts to be removed after the coupling has been properly adjusted without releasing any of the parts.

Without limiting myself to the exact construction and arrangement of parts or to the particular embodiment of the invention illustrated in the drawings, what I claim, and desire to secure by Letters Patent, is—

1. In a pipe coupling or connection the combination of a sewer-pipe, a member within the end of said pipe, a soil-pipe entering the member through an opening therein, packing between the member and each of said pipes, and a lever for securing said member in place and comprising a two-section ring having its parts suitably engaged.

2. In a pipe coupling or connection the combination of a sewer-pipe provided with an external shoulder, a member within the end of said pipe, a soil-pipe entering the member through an opening therein, packing between the member and each of said pipes, a yoke provided with depending ends, and a lever made in two sections adapted to be engaged with each other and connected with the ends of the yoke to operate against said shoulder to clamp the parts together.

3. In a pipe coupling or connection the combination of a sewer-pipe, an external shoulder on said pipe, a member within the end of said pipe, a soil-pipe entering the member through an opening therein, packing between the member and each of said pipes, a yoke provided with depending ends, and a lever connected with the ends of the yoke to clamp the parts together, said lever comprising two sections of a ring with interengaging ends to encircle the sewer-pipe and operate against said shoulder.

4. In a pipe coupling or connection the combination of a sewer-pipe, an external shoulder on said pipe, a member within the end of said pipe, a soil-pipe entering the member through an opening therein, packing between the member and each of said pipes, a yoke with depending ends, stops on said ends, a lever operating against said shoulder and adapted to be engaged with said stops, and means for adjusting the lever relatively to the yoke within the ends to clamp the parts together.

5. In a pipe coupling or connection, the combination of a sewer-pipe an external shoulder on said pipe, a member within the end of said pipe, a soil-pipe entering the member through an opening therein, packing between the member and each of said pipes, a yoke with depending ends, stops on said ends, a lever made in two sections suitably engaged to operate against said shoulder and engage with said stops, and a bolt adjacent to each of said ends for adjusting the lever and the yoke relatively with the lever engaging the stops.

FRANK W. CARLSON.

Witnesses:
 WM. O. BELT,
 RITA WINTER.